US007875306B2

(12) United States Patent
Cingotti

(10) Patent No.: US 7,875,306 B2
(45) Date of Patent: Jan. 25, 2011

(54) COMPLETELY-SOLUBLE SOLID PARTICLE(S) BASED ON DIETARY FIBRE(S)

(75) Inventor: Dominique Cingotti, Villeurbanne (FR)

(73) Assignee: Maya Flowers S.A., Panama (PA)

( * ) Notice: Subject to any disclaimer, the term of this patent is extended or adjusted under 35 U.S.C. 154(b) by 503 days.

(21) Appl. No.: 11/573,216

(22) PCT Filed: Aug. 1, 2005

(86) PCT No.: PCT/FR2005/050636

§ 371 (c)(1),
(2), (4) Date: Feb. 5, 2007

(87) PCT Pub. No.: WO2006/021720

PCT Pub. Date: Mar. 2, 2006

(65) Prior Publication Data

US 2008/0138492 A1    Jun. 12, 2008

(30) Foreign Application Priority Data

Aug. 6, 2004   (FR)   .................................. 04 51807

(51) Int. Cl.
 A23G 3/00   (2006.01)
 A23L 1/05   (2006.01)
 A21D 2/16   (2006.01)
 A23L 1/22   (2006.01)
 A23D 9/013  (2006.01)

(52) U.S. Cl. ...................... 426/658; 426/661; 426/654; 426/533; 426/531

(58) Field of Classification Search ................. 426/658, 426/533, 661, 654, 531, 442
See application file for complete search history.

(56) References Cited

U.S. PATENT DOCUMENTS

| 4,060,645 A | 11/1977 | Risler et al. |
| 6,190,687 B1 | 2/2001 | Cingotti |
| 2002/0197372 A1 | 12/2002 | Janssen et al. |
| 2005/0220981 A1 | 10/2005 | Renz et al. |

FOREIGN PATENT DOCUMENTS

| EP | 1123660 A2 | | 8/2001 |
| FR | 2294653 A | | 7/1976 |
| WO | 9906028 A1 | | 11/1999 |
| WO | 0025606 A | | 5/2000 |
| WO | WO00/25606 | * | 5/2000 |
| WO | 0117372 A1 | | 3/2001 |
| WO | 0143568 A1 | | 6/2001 |
| WO | 02065858 A1 | | 8/2002 |
| WO | 03092412 A2 | | 11/2003 |

OTHER PUBLICATIONS

Niness, Nutritional and Health Benefits of Inulin and Oligofructose, May 1998.*

\* cited by examiner

*Primary Examiner*—Callie E Shosho
*Assistant Examiner*—Lela S Williams
(74) *Attorney, Agent, or Firm*—Heslin Rothenberg Farley & Mesiti PC

(57) ABSTRACT

A completely-water-soluble solid particle is based on at least one aroma and a support comprising water-soluble dietary fibers. The particle has a hardness of at least 0.2 GPa.

7 Claims, 12 Drawing Sheets

US 7,875,306 B2

COMPLETELY-SOLUBLE SOLID PARTICLE(S) BASED ON DIETARY FIBRE(S)

CROSS REFERENCE TO RELATED APPLICATIONS

This is a Section 371 filing of International Application PCT/FR2005/050636, filed on Aug. 1, 2005, and published, in French, as International Publication No. WO 2006/021720 on Mar. 2, 2006, and claims priority of French Application No. 0451807, filed on Aug. 6, 2004, which applications are hereby incorporated by reference herein, in their entirety.

BACKGROUND ART

The invention relates to a completely-soluble solid particle based on soluble dietary fibre(s) and at least one active substance particularly for a dietetic, cosmetic or pharmaceutical purpose.

In general, the particles of the invention may comprise any type of active substance, and preferably substances of plant origin, particularly in the form of a plant extract or part of a plant. In the rest of the description, the invention is more particularly described in relation to the use of aromas as the active substance. In the context of the invention, "aroma" here means any product or substance designed to be added to foods to give them an odour, a taste, or both. Among the aromas, a distinction is made between natural aromatizing substances, aromatizing substances identical to natural aromatizing substances, artificial aromatizing substances, aromatizing preparations, processed aromas and smoke aromas.

A natural aromatizing substance is a chemically defined substance which is obtained either by appropriate physical methods, including distillation and solvent extraction, or by enzymatic or microbiological methods, from a material of plant or animal origin, taken as such or after its processing for human consumption by conventional food preparation methods, including drying, roasting and fermentation. This category particularly includes essential oils and pure aromas.

An aromatizing substance identical to a natural aromatizing substance is a defined chemical substance which is chemically identical to a natural aromatizing substance after having been obtained by chemical synthesis or isolated by chemical methods.

An artificial aromatizing substance is a defined chemical substance which, having been obtained by chemical synthesis, is not chemically identical to a natural aromatizing substance.

An aromatizing preparation is a product, other than a natural aromatizing substance, concentrated or not, which is obtained by appropriate physical methods, including distillation and solvent extraction, or by enzymatic or microbiological methods, from a material of plant or animal origin, taken as such or after its processing for human consumption by conventional food preparation methods, including drying, roasting and fermentation.

A processed aroma is a product obtained by heating to a temperature not exceeding 180° C. for a period not exceeding 15 minutes of a mixture of ingredients which have aromatizing properties or not, provided that the components of the mixture comprise at east one ingredient containing nitrogen and at least one ingredient serving as a reducing sugar.

A smoke aroma is a smoke extract which is used in conventional food smoking methods.

All of these products have a specific analytical profile which can be characterized particularly by gas chromatography, and which it is necessary to restore as much as possible in the particle of the invention.

In the description and the claims, the expression "soluble dietary fibres" means any compound of completely-water-soluble plant cells, withstanding the various enzymatic hydrolyses occurring during a physiological process of digestion. More precisely, the enzymes of the organism abundantly present in the small intestine, such as sucrase-maltase, have no hydrolytic action on the bonds of the units forming the fibres, thereby causing no increase in glycemia, and in the rate of insulin in the blood. These fibres are composed of cellulose, hemicellulose, oligosaccharides, pectin, gums, waxes, these various compounds are those taken into account in the analyses of dietary fibres. Soluble fibres should be distinguished from sugars or sugar derivatives, such as for example sucrose, glucose, lactose, maltodextrin, etc., which are rapid or slow directly assimilable sugars.

According to the invention, the dietary fibres consist of a completely-water-soluble polymer selected particularly from the group comprising inulin, oligofructoses (also called fructo-oligosaccharides (FOS)), gum arabic, used alone or in mixtures.

a known manner, inulin is a mixture of oligomers and polymers of fructose, obtained by extraction particularly from chicory roots. The structure of inulin can be represented by the formula GFn, in which:
G=glycosyl unit,
F=fructosyl unit,
n=number of bound fructosyl units (n>2),
DP=degree of polymerization varying between 2 and 60,
bond of the $\beta(1\text{-}2)$ type.

In practice, inulin consists of some 60 fructose units.

Fructo-oligosaccharides correspond to a mixture of oligomers and polymers of fructose obtained by inulin hydrolysis.

The FOS structure can be represented by the formula GFn or Fm, in which:
G=glycosyl unit,
F=fructosyl unit,
N and m=number of the bound fructosyl units (n>2),
DP=degree of polymerization varying between 2 and 20,
bond of the $\beta(1\text{-}2)$ type.

In practice, FOS consist of 10 fructose units.

Document WO 99/06028 describes a method for producing granules from dietary fibres like those of the present invention. More precisely, the dietary fibres are in atomized form and are contacted with an extract of active ingredient, for example essential oils, in a solvent medium and in the absence of binder, before a final oven drying step, to remove the solvent. In this method, a porous atomized support with a high specific surface area is used, in order to impregnate the maximum of extract at the surface and in the pores of the structure. The absence of binder makes it possible to recover, at the end of the method, as many atomized particles as existed initially. Furthermore, it is stipulated that the solvent must be selected so that it is incapable of solubilizing the dietary fibres. It therefore follows that the structure of the dietary fibres is unchanged during the method. The granules obtained, 1 mm in size, have mechanical properties, particularly hardness, incompatible with a subsequent calibration operation. In fact, the granules cannot be reduced in size without causing a high loss of material, due to their high friability.

Document WO 01/17372 describes a method for producing granules based on aromas and maltodextrin. This technique consists in solubilizing the aroma in water, then in wetting the maltodextrin with the solution obtained to form a paste. In the absence of water, the pasty state is impossible to obtain. The paste is then heated to a temperature of 90 to 130° C. to evaporate the water and hence harden. The paste is then extruded and calibrated. The drawback of this method is the need for high temperatures and pressures (between 1 and 50 bar) which, added to the necessary presence of water, completely modify the chromatographic profile of the aromas. Moreover, due to the presence of water, only water-soluble hence hydrophilic active ingredients are employed.

Document FR-A-2 294 653 describes porous grains obtained by placing a mixture under vacuum comprising an assimilable maltodextrin.

Documents WO 03/092912, EP-A-112 660, WO 00/25606, WO 01/17372 and WO 02/65858 describe solid particles, comprising assimilable maltodextrins. Furthermore, nothing is said concerning the maintenance of the aromatic profile of the basic aroma after extrusion.

Document WO 01/143568 describes granules obtained by the extrusion of a 10 mixture of inulin and sugar, particularly accsulfame K. No reference is made to the possible combination of inulin with an aroma and hence to the problem of the aromatic profile of the aroma obtained after extrusion.

The problem which the invention proposes to solve is hence to develop a method for preparing completely-soluble granules, based particularly on aromas, in which the aromatic profile of the said aromas is unchanged from the original profile. At the same time, the objective is to have granules which are then suitable for calibration and conditioning without loss of material.

BRIEF SUMMARY OF THE INVENTION

To solve this problem, the Applicant has developed a novel method essentially consisting in extruding in a die, without the addition of water, a mixture comprising soluble dietary fibres and at least one active substance. The Applicant has in fact found that the dietary fibres selected from the abovementioned group, solid at ambient temperature, are converted to become semi-solid under the effect of heat, and in the absence of solvent and, in general, of any additive. Furthermore, it has been observed that this change of state occurred from a temperature of about 30° C. or more, suitable for preparing particles based on heat-sensitive active ingredients. Finally, the solid state recovered after cooling has a much higher hardness and lower friability compared to the corresponding values of the dietary fibres in the natural state.

In other words, the dietary fibres constitute an ideal support for the production of completely-soluble particles for ingestion, making it possible, thanks to the change of state caused by the temperature rise alone, on the one hand, to overcome the need for the presence of water mentioned in document WO 01/17372 and on the other, to include heat-sensitive active ingredients in a matrix and not impregnate them on individualized particles as is the case in document WO 99/06028. The advantage of this method is hence to restore all the properties of the starting active ingredient and particularly its analytical profile. Furthermore, the hardened form obtained after cooling has a high hardness suitable for calibrating the particles in a wide range and as required, and without any problem of friability.

The invention hence relates to a completely-water-soluble solid particle, based on at least one active substance and on a support comprising water-soluble dietary fibres advantageously selected from the group comprising inulin and/or fructo-oligosaccarides (FOS) and/or gum arabic, which is characterized in that it has a hardness, measured by nanoindentation, of at least 0.2 GPa, advantageously of between 0.3 and 0.4 GPa.

The nanoindentation technique consists in imprinting a tiny diamond indenter on the surface of a solid material and recording the indentation load/penetration depth curve during a loading/unloading test. The hardness of the material is then determined from this curve. The precise protocol for measuring the hardness is described below.

Obviously, the hardness of the particle depends on the type of active substance incorporated. If the active substance is mixed with the dietary fibres in liquid form, the particle will then, in the abovementioned range, have a lower hardness than if the active substance is incorporated in solid form. The hardness will also be influenced by the content of the active substance in the particle. In practice, the active substance accounts for between 0.1 and 10% by weight of the particle.

According to another feature of the invention, the particle has a size of between 0.1 and 3 mm, advantageously of between 0.3 and 2 mm. Obviously, in a particle population, the abovementioned sizes correspond to average sizes.

As stated above, the support contains soluble dietary fibres. In an advantageous embodiment, the support consists exclusively of soluble dietary fibres.

As already stated, the active substance is advantageously an aroma.

In an advantageous embodiment, the particle contains, in addition to the dietary fibres, between 2 and 5% by weight of essential oil, and has a hardness of between 0.2 and 0.3 GPa.

The particles obtained can be used in various galenic forms, such as particularly sachet, tablet, capsule, powder, inclusion in pasty forms, etc.

Such a particle can be obtained by a method in which, in the absence of hydrophilic solvent:
the dietary fibres and the active substance are mixed to obtain a semi-solid mass,
the mixture obtained is extruded through a die,
the filaments formed are cooled and calibrated to the desired size to obtain particles.

According to an essential feature, the method is carried out in the absence of a hydrophilic solvent to thereby avoid solubilization of the dietary fibres. In the context of the invention, hydrophilic solvent therefore means any solvent capable of dissolving the dietary fibres, particularly water.

According to an advantageous feature, the dietary fibres are used in powder form. The powder form may correspond to an atomized or micronized form from natural fibres. In fact, contrary to the dietary fibres used in the prior art, the specific surface area (atomized, micronized) is immaterial insofar as the material undergoes a change of state causing the particles to lose their basic structure.

According to another feature, the fibres are mixed to obtain a semi-solid mass. Depending on the type and quantity of the active substance used, but also on the mechanical properties of the extruder, the latter generates heat during its operation, that is, in the absence of an external energy input. Thus the temperature may vary throughout the method within the range of values comprised between 30 and 130° C., with the understanding that a person skilled in the art will adjust the operating parameters of the extruder to avoid reaching temperatures capable of distorting the analytical profile of the active ingredient. The active substance can be incorporated with the fibres during the temperature rise or once the semi-solid state has been reached. The active material can be incorporated in various forms which depend on the physicochemical nature of the said active substance.

When the active substance is in solid form, it is incorporated either directly or in dissolved or dispersed form in a hydrophobic solvent, with the understanding that any hydrophilic solvent is, as already stated, prohibited. Thus in all cases in which the active ingredient is water-soluble, it is placed in a hydrophobic medium by any technique known to a person skilled in the art before being contacted with the dietary fibres.

In practice, the hydrophobic solvent is liquid at ambient temperature. It is particularly selected from the group comprising triacetin, vegetable or mineral oils, without this list being limiting.

When the active substance is liquid in the natural state, it can be incorporated as such, particularly by granulation in the dietary fibres provided that it is hydrophobic. If not, the liquid active substance is made hydrophobic prior to its mixing with the dietary fibres.

In a third step, the mixture of dietary fibres in which the active substance is included is extruded. This extrusion is carried out through a die, while the mixture is still in the semi-solid state.

As they emerge from the die, the filaments cool in contact with the ambient temperature.

The size of the die is obviously selected according to the desired size of the particles, with the understanding that the filaments obtained are then divided. This final division step can be carried out by various methods such as grinding or even crushing.

The invention and its advantages will appear more clearly from the following exemplary embodiments in support of the figures appended hereto.

DETAILED DESCRIPTION

EXAMPLE 1

Restoration of the Chromatographic Profile of the Natural Essential Oil in the Particle In an extruder, an inulin/FOS mixture is introduced in a ratio 60/40 (Raftiline raftilose® P95 from ORAFTI or Fibrulose® from COSUCRA) in powder form and essential oil of orange in a weight ratio of 96/4. The mixture of the two products generates a temperature rise to about 35° C., at which temperature the mixture becomes semi-solid. The said mixture is then extruded through the die and the filaments formed are calibrated to a size of 4 mm. After cooling, the particles formed are recovered.

Gas chromatography is then carried out to compare the profile of the reference essential oil and that of the essential oil recovered after dissolution of the particle in water and distillation of the water.

Figure 1A:
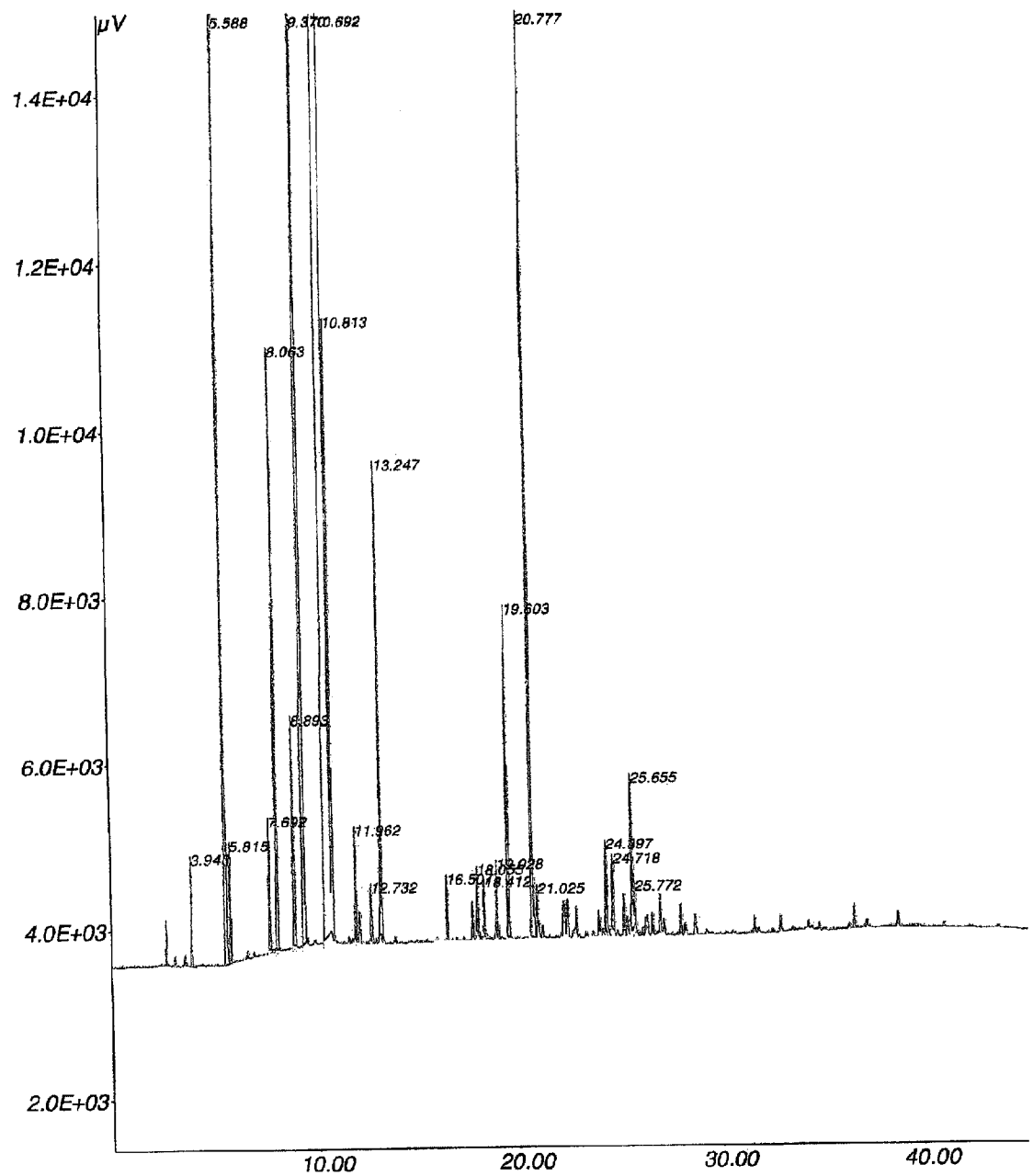
FIG. 1 corresponds to the gas chromatographic profiles respectively of a natural orange aroma (FIG. 1a) and the same aroma incorporated in a particle of the invention (FIG. 1b).
Figure 1B:
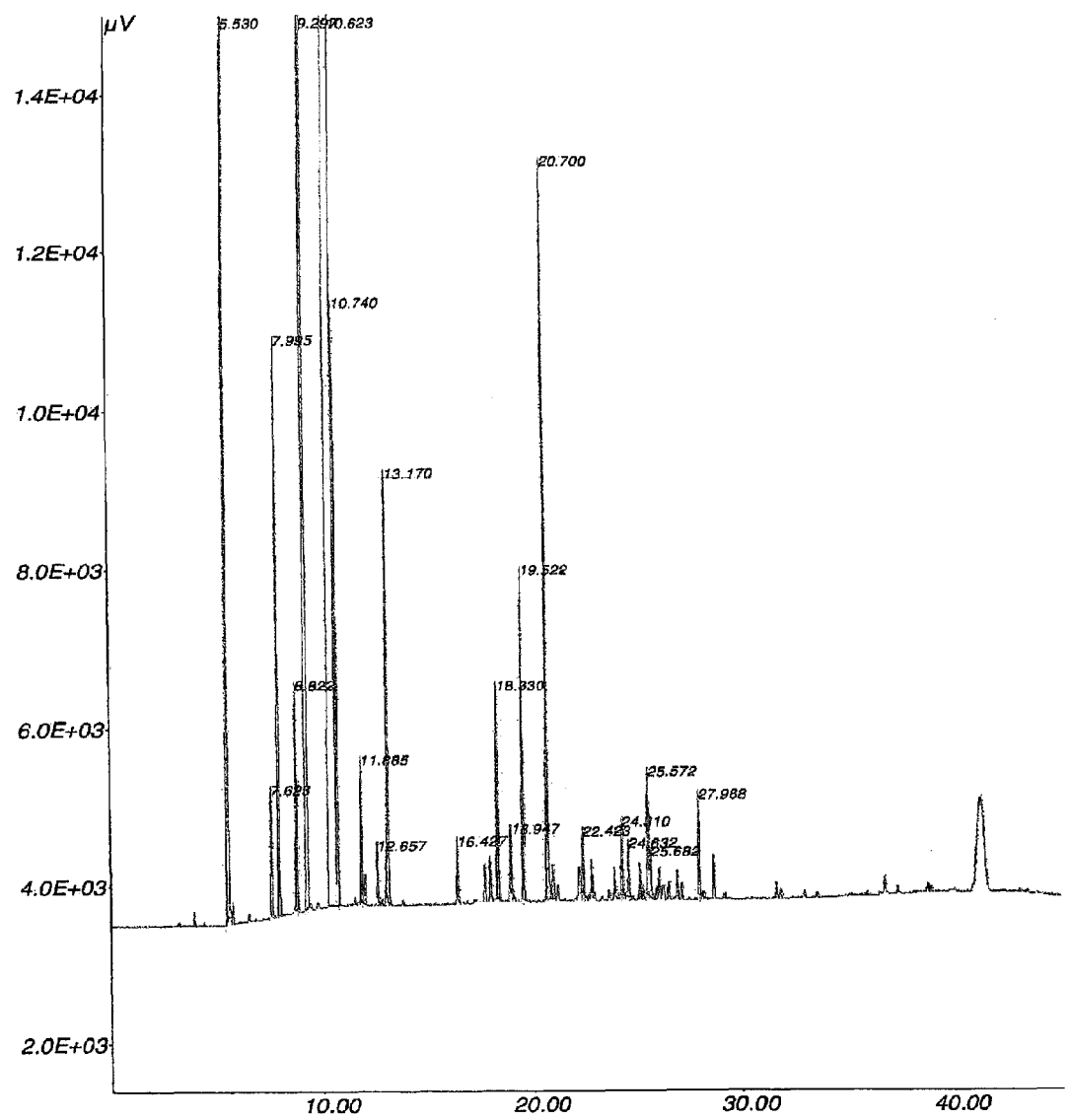

FIGS. 1a and 1b show the gas chromatography profiles of a reference (essential oil of orange) (FIG. 1) and of the sample (FIG. 1b).

As these figures show, the chromatographic profiles of the sample and the reference are identical. Hence this means that the aromatic profile of the essential oil is completely restored in the particle.

EXAMPLE 2

Measurement of Hardness of Particles by Nanoindentation

In an extruder, an inulin/FOS mixture is introduced in a ratio 60/40 (Raftiline raftilose® P95 from ORAFTI or Fibrulose® from COSUCRA) in powder form and essential oil of mint in a weight ratio of 97/3. The mixture of the two products generates a temperature rise to about 35° C., at which temperature the mixture becomes semi-solid. The said mixture is then extruded through the die and the filaments are then calibrated. After cooling, particles are recovered having an average size of between 0.335 and 2.25 mm.

The hardness of the particles obtained is measured by a nanoindentation on an XP® nanoindenter from Nano Instruments. The test method used is a dynamic method. The principle of the dynamic method is based on the superimposition of a continuous movement and an oscillating movement at fixed frequency (32 Hz) and low amplitude (5 mm). Thus loading is accompanied by a succession of small loadings and small unloadings, which means that the material is elastically and then plastically and then again elastically deformed. The tests are performed at a constant loading rate P'/P ($3.10^{-2} s^{-1}$).

Figure 2:
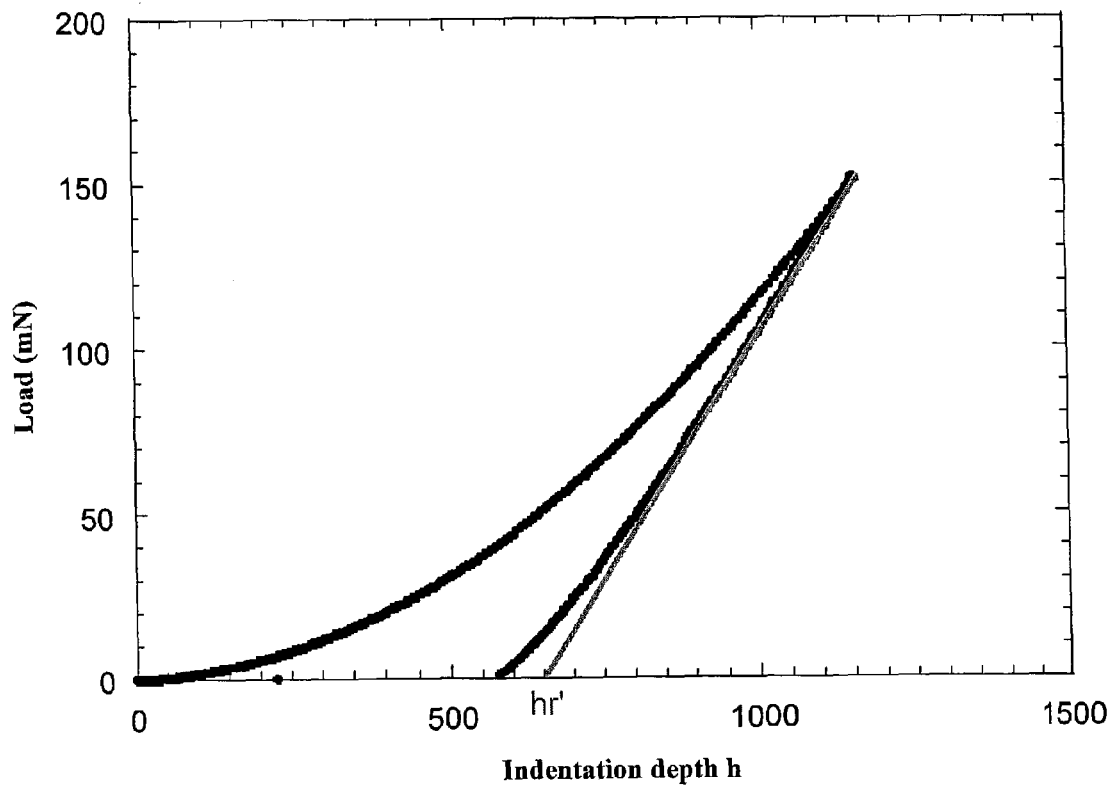
FIG. 2 corresponds to the curve obtained after the indentation test performed by the dynamic method on an elastoplastic material: silica.

The curve shown in FIG. 2 corresponds to the indentation test performed by the dynamic method on an elastoplastic material: silica.

In this curve, the elastoplastic behaviour of the material is clearly demonstrated insofar as the unloading curve has nearly the same slope as the loading curve. This means that the plastic penetration under load is very low and that the material is therefore very slightly deformed plastically.

Based on this curve and the following equations, it is possible to determine the following mechanical quantities at any point:

Contact stiffness: S: corresponds to the slope of the unloading curve of the indentation test:

$$S = \frac{P}{h - h_{R'}}$$

Contact area:

$$A_{indentation} = 24.56 * \delta^2 = 24.56 * [1.2 * (h_{R'} + h_0)]^2 = 35.37 * (h_{R'} + h_0)^2$$

Hardness: H $$H = \frac{P}{A_{indentation}} = \frac{P}{35.37 * (h_{R'} + h_0)^2}$$

Conservation modulus:

$$\frac{E'}{1 - v^2} = \frac{S * \sqrt{\pi}}{2 * \sqrt{A_{indentation}}} = \frac{S * \sqrt{\pi}}{2 * \sqrt{35.37 * (h_{R'} + h_0)^2}}$$

Loss modulus:

$$\frac{E''}{1-v^2} = \frac{d\omega * \sqrt{\pi}}{2*\sqrt{A_{indentation}}} = \frac{d\omega * \sqrt{\pi}}{2*\sqrt{35.37*(h_{R'}+h_0)^2}}$$

Tan δ:

$$\tan\delta = \frac{E''}{E'} = \frac{d\omega}{S}$$

where:

P: load h: total penetration $h_o$: point defect $h_1$: plastic penetration, height of contact in the material flow pad S: contact stiffness at 32 Hz obtained using the synchronous detector Dω: contact damping, phase difference between the displacement and the force measured using the synchronous detector.

Figure 3A:
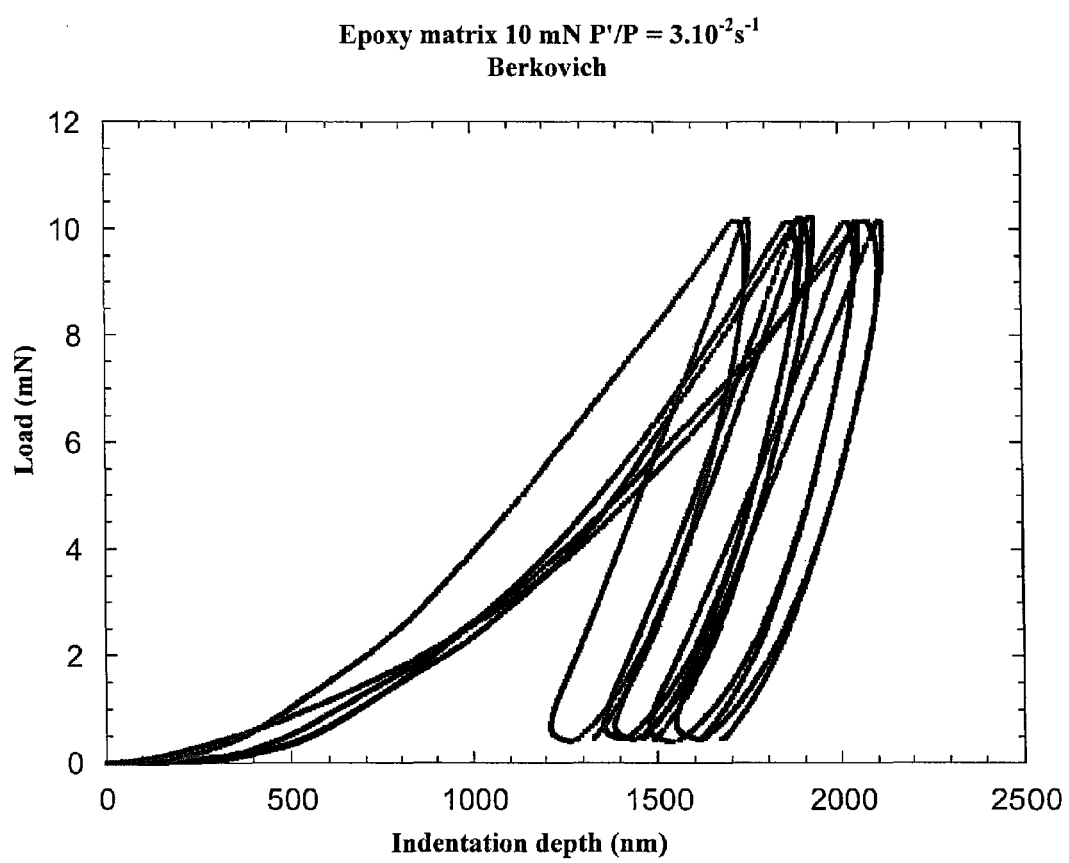
FIGS. 3, 4 and 5 correspond to the curves obtained after an indentation test carried out by the dynamic method respectively on epoxy (FIGS. 3 a, b, c), particles of the invention having a size of 1 mm (FIGS. 4 a, b, c) and 2 mm (FIGS. 5 a, b, c).
Figure 3B:
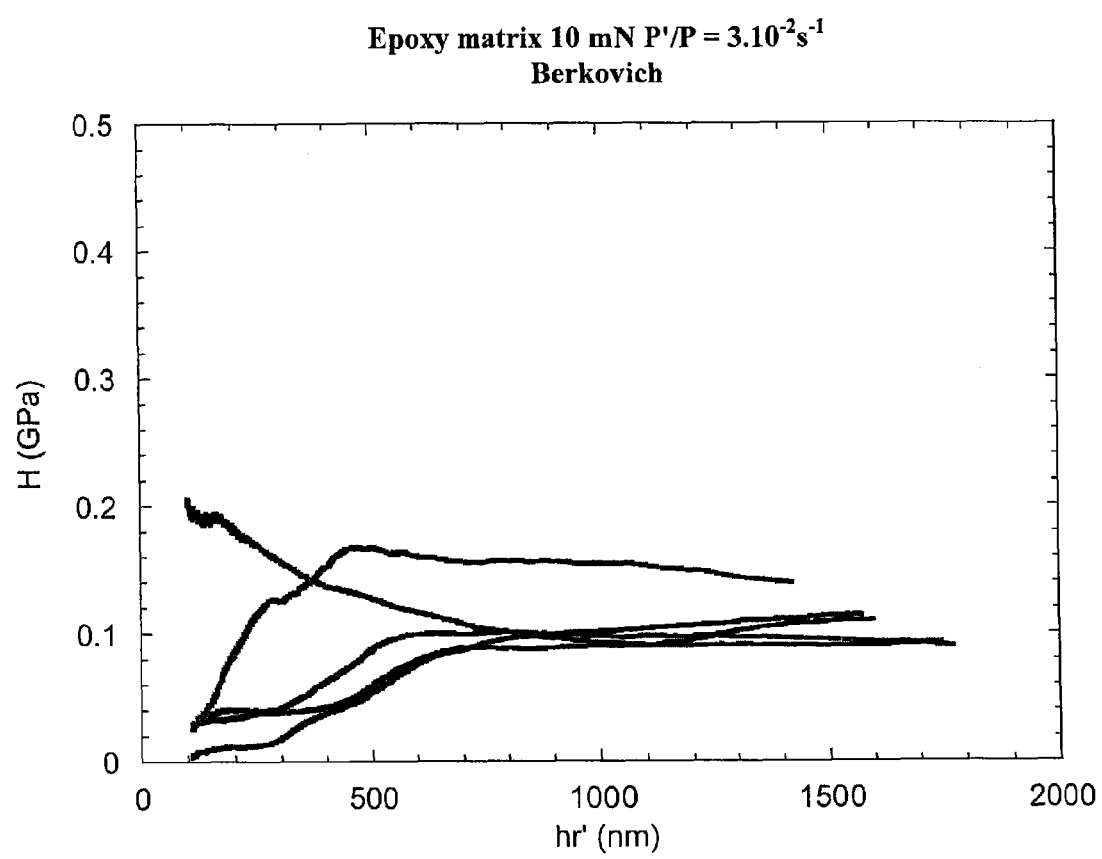
Figure 3C:
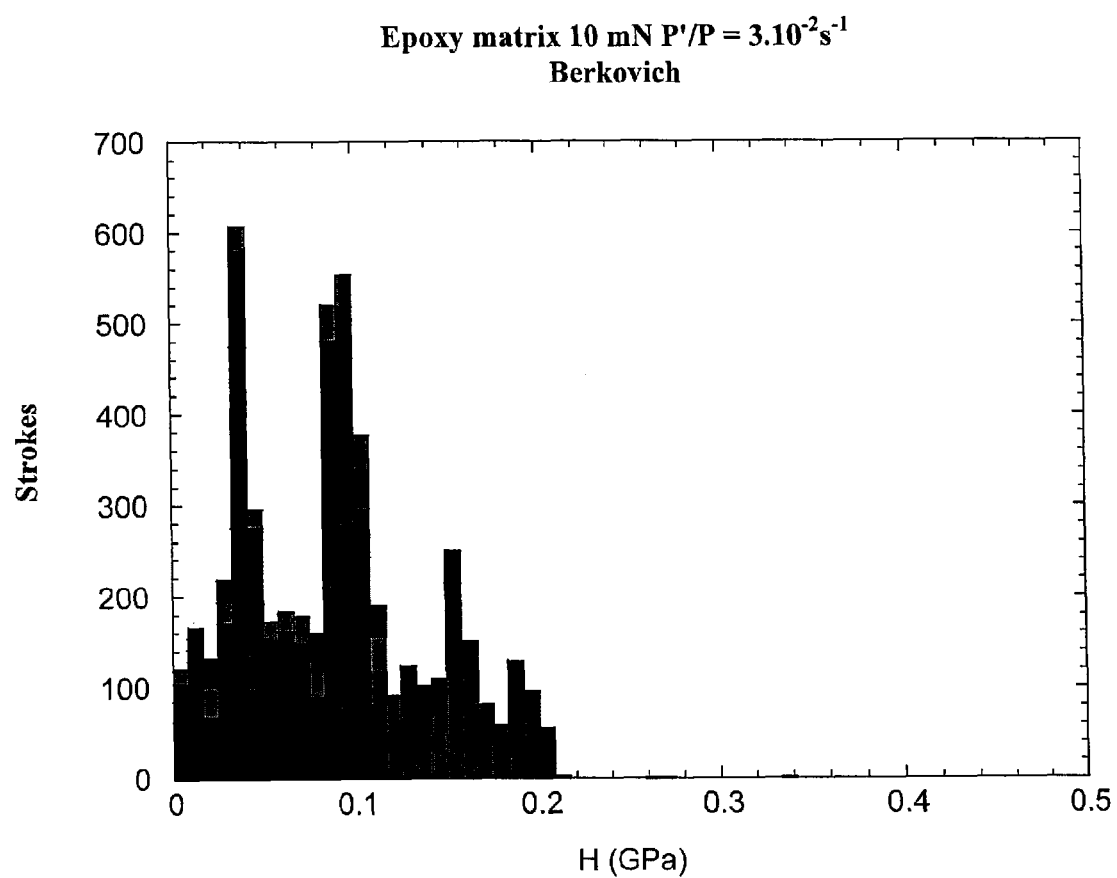
Figure 4A:
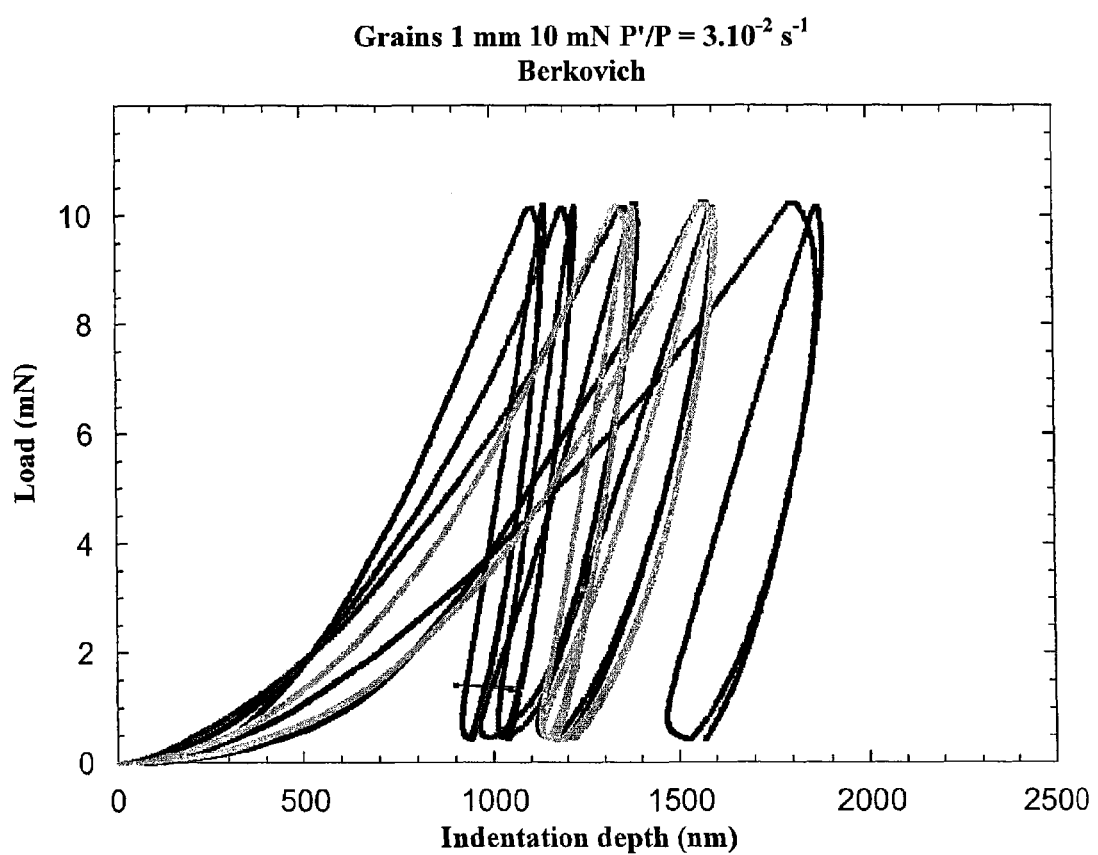
Figure 4B:
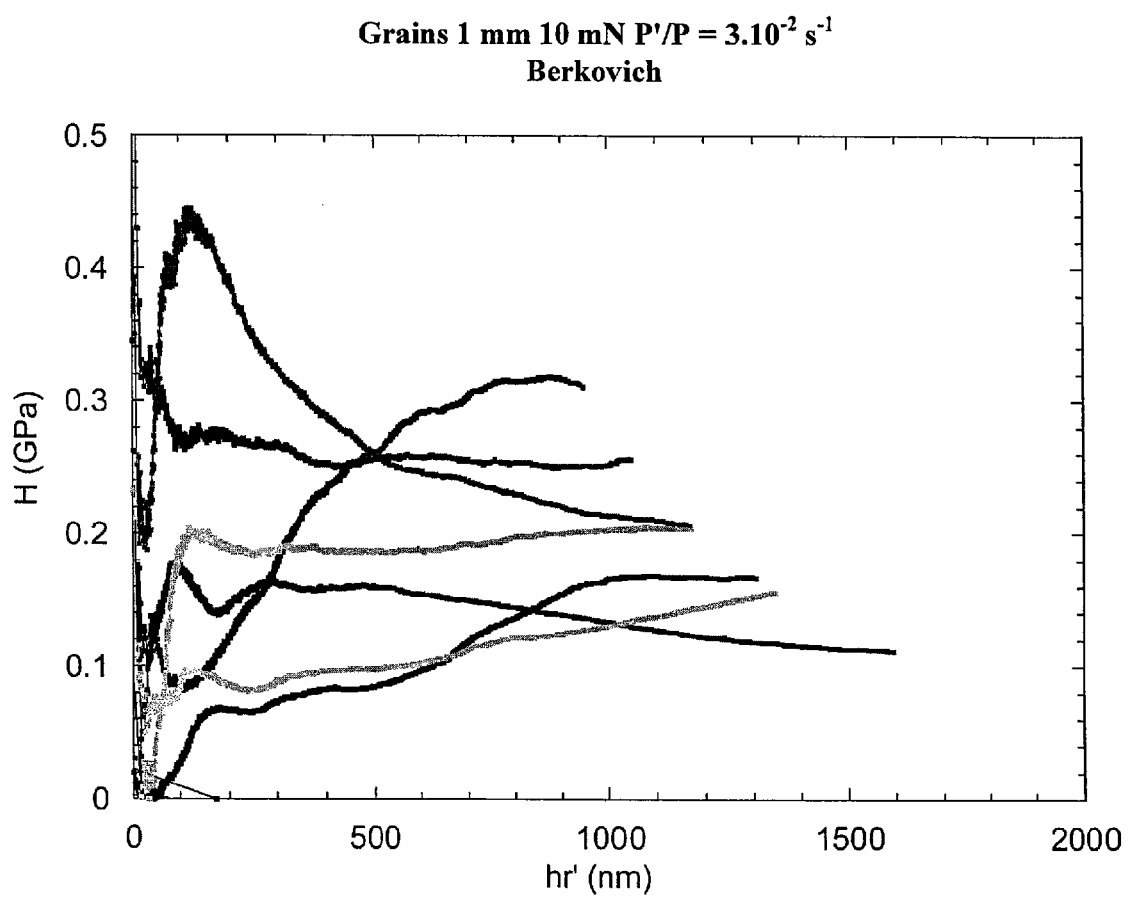
Figure 4C:
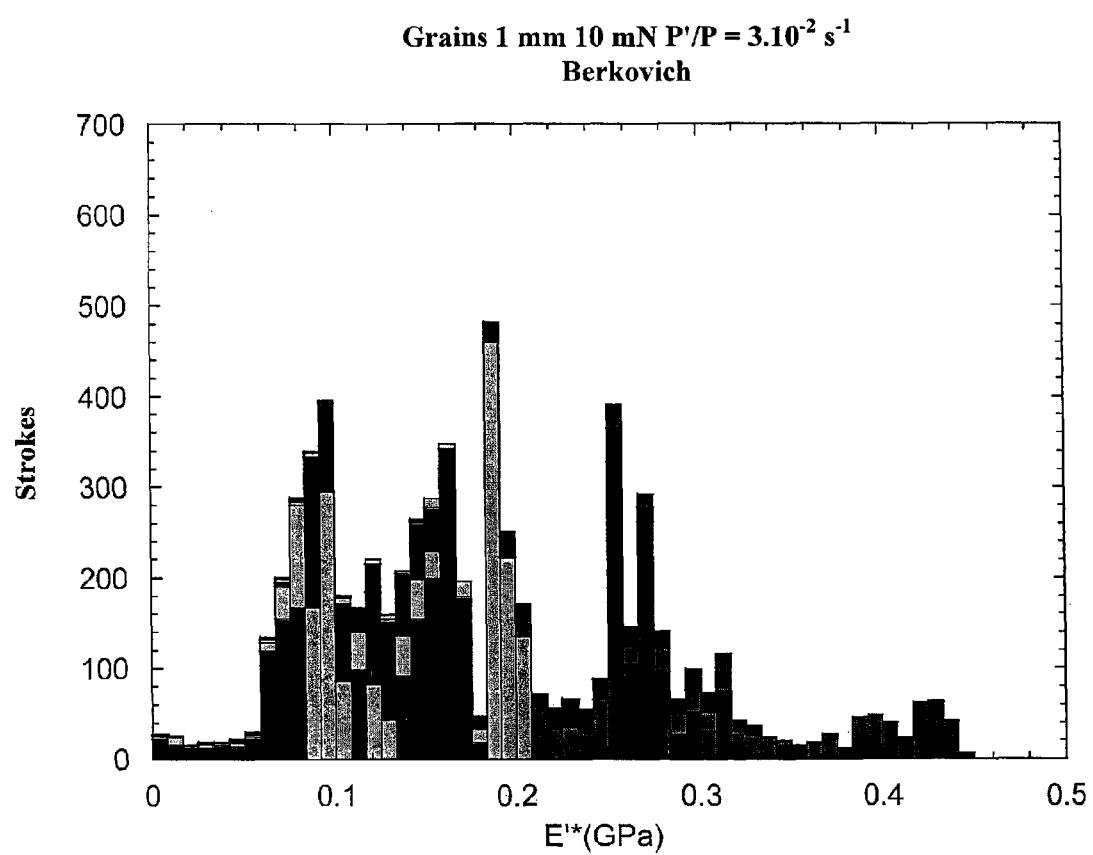
Figure 5A:
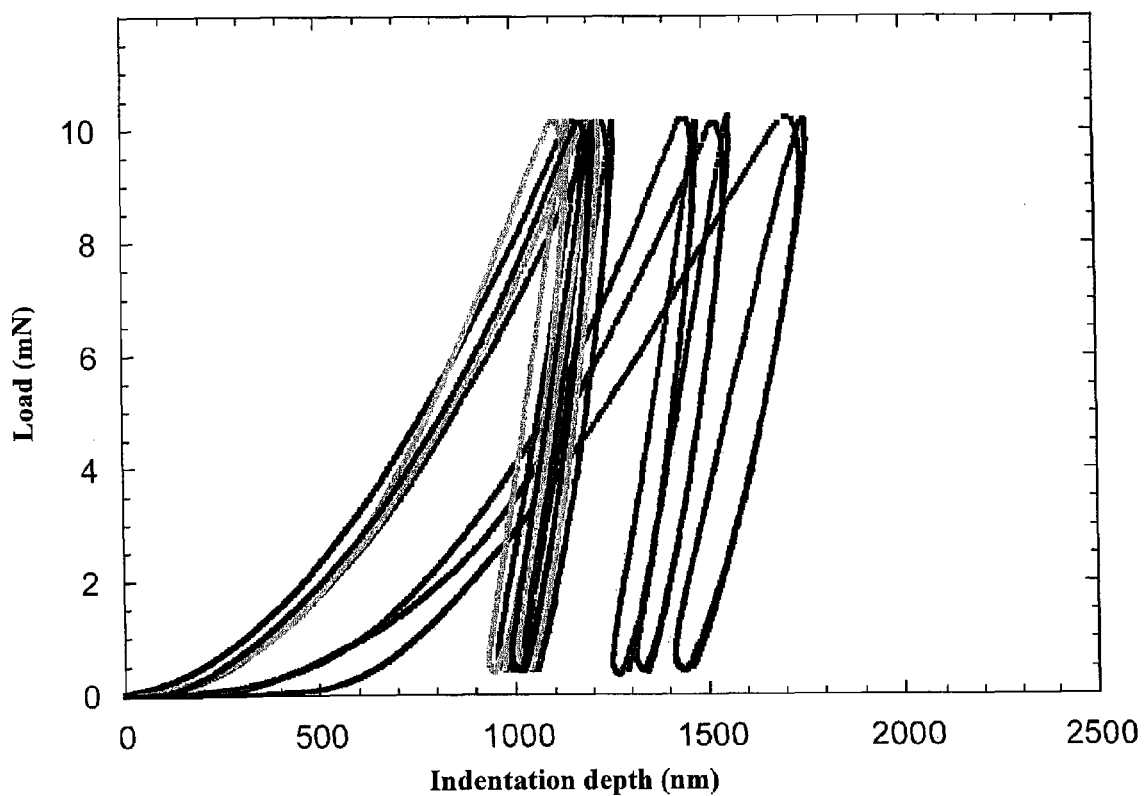
Figure 5B:
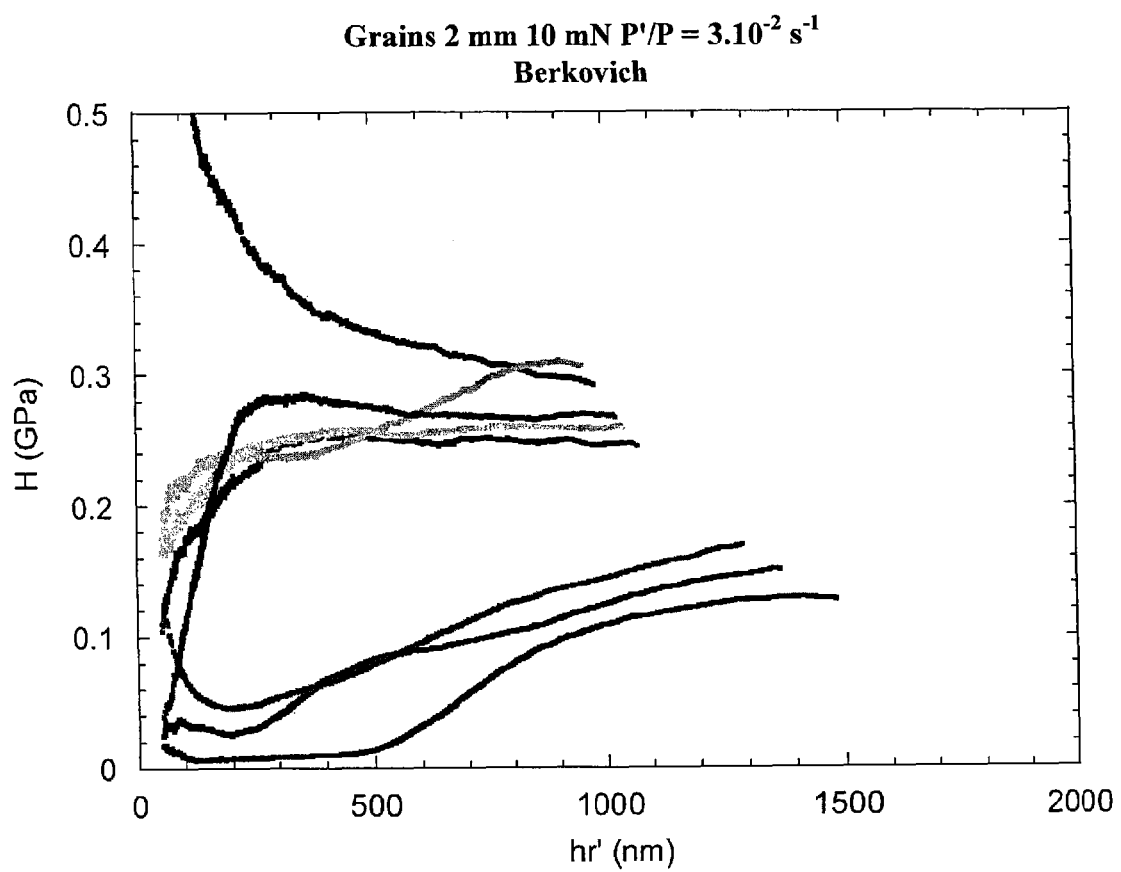
Figure 5C:
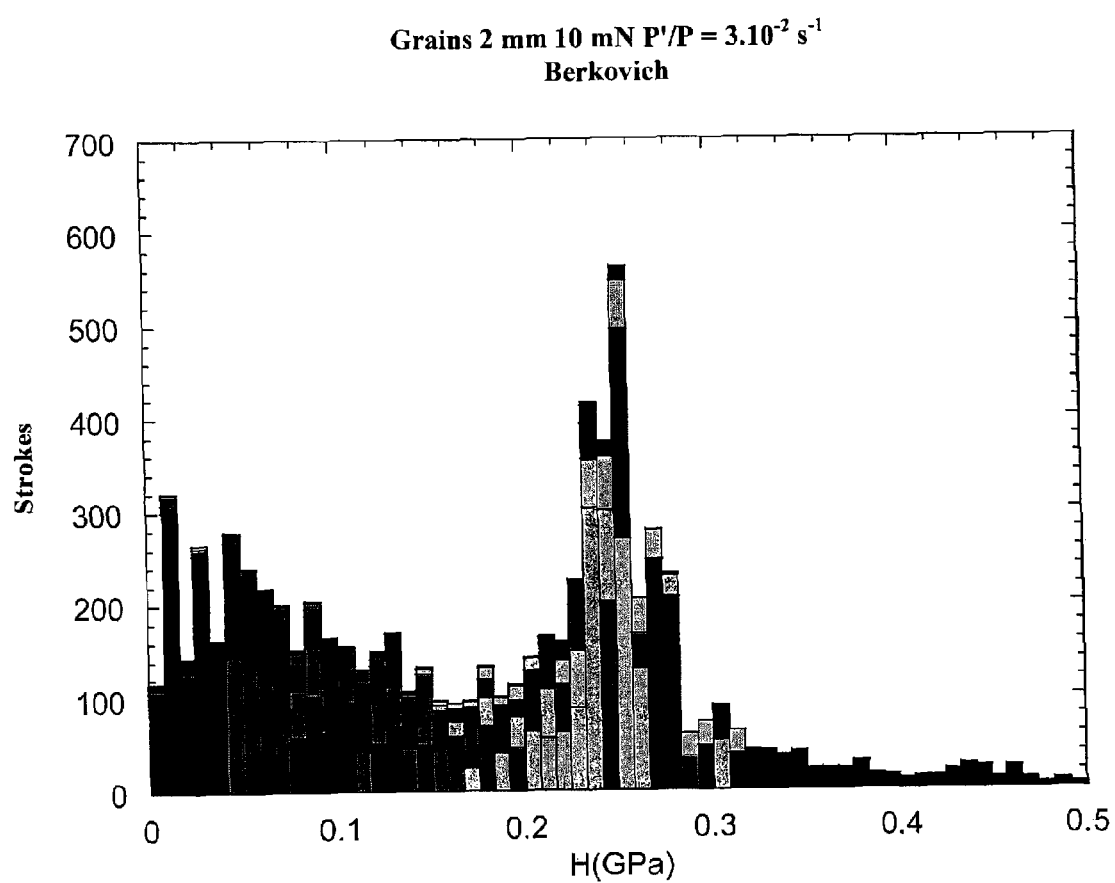

FIGS. 3 a,b,c, 4 a,b,c and 5 a,b,c show the results obtained by nanoindentation using a Berkovich indenter on a reference (epoxy matrix) and particles having a size of 1 mm (FIG. 4) and 2 mm (FIG. 5), under a load of 10 mN.

As shown by these different curves, the hardness measured both for the 1 mm grains and for the 2 mm grains is between 0.25 and 0.28 GPa.

The invention claimed is:

1. Method for producing completely-water-soluble solid particles that include at least one hydrophobic aroma on a support that consists of water-soluble dietary fibres, said method comprising:
    preparing a mixture of powdered water-soluble dietary fibres selected from the group consisting of inulin, oligofructoses, and mixtures thereof and said hydrophobic aroma in the absence of a hydrophilic solvent or water under conditions effective to obtain a semi-solid mass that consists essentially of said dietary fibres and said hydrophobic aroma,
    extruding the semi-solid mass through a die to form filaments,
    cooling the filaments, and
    calibrating the filaments to obtain solid particles of a desired size, wherein the particles have a hardness of at least 0.2 GPa.

2. Method according to claim 1 wherein when the hydrophobic aroma is in solid form, the hydrophobic aroma is incorporated as such in the mass, or is dissolved or dispersed in a hydrophobic solvent.

3. Method according to claim 2, wherein the hydrophobic solvent is selected from the group consisting of triacetin, vegetable oils, and mineral oils.

4. Method according to claim 1, wherein an initially hydrophilic aroma is incorporated in the mass after having been made hydrophobic.

5. Method according to claim 1, wherein hydrophobic aroma is in a liquid form.

6. Method according to claim 1, wherein said extruding is carried out at a temperature of about 30-130° C.

7. Method according to claim 1, wherein said conditions effective to obtain a semi-solid mass comprise a temperature of about 35° C.

* * * * *